US012565627B2

(12) United States Patent
Miracle et al.

(10) Patent No.: US 12,565,627 B2
(45) Date of Patent: Mar. 3, 2026

(54) PARTICLE TREATMENT COMPOSITIONS COMPRISING AN ANTIOXIDANT

(71) Applicant: The Procter & Gamble Company, Cincinnati, OH (US)

(72) Inventors: Gregory Scot Miracle, Liberty Township, OH (US); Daniel Dale Ditullio, Jr., Hamilton, OH (US); Yuexi Wang, Cincinnati, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 235 days.

(21) Appl. No.: 16/864,174

(22) Filed: May 1, 2020

(65) Prior Publication Data

US 2020/0347322 A1 Nov. 5, 2020

(30) Foreign Application Priority Data

May 3, 2019 (EP) .................................... 19172551

(51) Int. Cl.

| | |
|---|---|
| ***C11D 3/00*** | (2006.01) |
| ***C11D 1/72*** | (2006.01) |
| ***C11D 3/20*** | (2006.01) |
| ***C11D 3/37*** | (2006.01) |
| ***C11D 3/40*** | (2006.01) |
| ***C11D 3/50*** | (2006.01) |

(52) U.S. Cl.

CPC .............. *C11D 3/0084* (2013.01); *C11D 1/72* (2013.01); *C11D 3/0068* (2013.01); *C11D 3/2003* (2013.01); *C11D 3/3753* (2013.01); *C11D 3/40* (2013.01); *C11D 3/505* (2013.01)

(58) Field of Classification Search

CPC ....... C11D 3/0084; C11D 1/72; C11D 3/2034; C11D 3/2079; C11D 3/1206; C11D 11/0017; C11D 3/50; C11D 3/30; C11D 3/2003; C11D 3/40; C11D 3/0068; C11D 3/505; C11D 3/3753

See application file for complete search history.

(56) References Cited

U.S. PATENT DOCUMENTS 3,356,612 A * 12/1967 Guthrie .................... C11D 3/06 510/233
5,650,509 A * 7/1997 Bacher ................ D06M 13/152 562/51

(Continued)

FOREIGN PATENT DOCUMENTS

CN 1375024 A 10/2002
CN 1981010 A 6/2007

(Continued)

OTHER PUBLICATIONS

JP2004292471A Google Patents Tranlation (Year: 2004).*

(Continued)

*Primary Examiner* — Angela C Brown-Pettigrew
*Assistant Examiner* — Preeti Kumar
(74) *Attorney, Agent, or Firm* — Kathleen Y. Carter

(57) ABSTRACT

A treatment composition including a plurality of first particles. Each first particle having from greater than 2% to about 50%, by weight of each first particle, of an antioxidant. Each first particle further having a water-soluble first carrier. Each first particle having less than 20%, by weight of each first particle, of polyvinyl alcohol.

18 Claims, 1 Drawing Sheet

(56) References Cited

U.S. PATENT DOCUMENTS

| | | | | |
|---|---|---|---|---|
| 5,763,378 | A * | 6/1998 | Painter | C11D 3/3707 560/220 |
| 7,375,070 | B2 * | 5/2008 | Pegelow | C11D 17/043 510/439 |
| 7,867,968 | B1 | 1/2011 | Aouad | |
| 2007/0190873 | A1 | 8/2007 | Batchelor et al. | |
| 2009/0203817 | A1 * | 8/2009 | Stretanski | C08K 5/375 524/100 |
| 2009/0258041 | A1 | 10/2009 | Mongiat et al. | |
| 2010/0160486 | A1 * | 6/2010 | Blanton | C08L 23/10 523/122 |
| 2011/0268802 | A1 | 11/2011 | Dihora | |
| 2016/0273157 | A1 * | 9/2016 | Akechi | D06N 3/042 |
| 2017/0114304 | A1 | 4/2017 | Miracle | |
| 2017/0198432 | A1 | 7/2017 | Richards et al. | |
| 2017/0349865 | A1 | 12/2017 | Zerhusen et al. | |
| 2018/0119065 | A1 | 5/2018 | Miracle | |
| 2020/0347321 | A1 | 11/2020 | Miracle | |

FOREIGN PATENT DOCUMENTS

| | | | | |
|---|---|---|---|---|
| CN | 101421381 | A | 4/2009 | |
| CN | 101588715 | A | 11/2009 | |
| CN | 102549135 | A | 7/2012 | |
| CN | 102597204 | A | 7/2012 | |
| CN | 105980553 | A | 9/2016 | |
| CN | 108138092 | A | 6/2018 | |
| EP | 1179037 | A1 | 2/2002 | |
| EP | 2334776 | A1 | 6/2011 | |
| EP | 2987849 | A1 | 2/2016 | |
| JP | S57128283 | A | 8/1982 | |
| JP | S57128823 | A | 8/1982 | |
| JP | H08239696 | A | 9/1996 | |
| JP | 2004204085 | A | 7/2004 | |
| JP | 2004292471 | A * | 10/2004 | |
| JP | 2011168732 | A | 9/2011 | |
| JP | 2011190368 | A | 9/2011 | |
| JP | 2016516452 | A | 6/2016 | |
| JP | 2018534399 | A | 11/2018 | |
| WO | WO-0122942 | A1 * | 4/2001 | A61K 47/44 |
| WO | 03038183 | A1 | 5/2003 | |
| WO | WO2006002714 | A1 | 1/2006 | |
| WO | WO-2006002777 | A1 * | 1/2006 | C11D 3/0063 |
| WO | WO2007079831 | A1 | 7/2007 | |
| WO | WO-2008121279 | A1 * | 10/2008 | A01N 25/10 |
| WO | 2013171210 | A1 | 11/2013 | |
| WO | 2014148459 | A1 | 9/2014 | |
| WO | WO-2017210393 | A1 * | 12/2017 | C11D 17/041 |

OTHER PUBLICATIONS

JEFFAMINE ED900 MSDS, 2 pages (Year: 2021).*

European Search Report; Application No. 19172542.3, mailed on Aug. 21, 2019, 6 pages.

European Search Report; Application No. 19172551.4, mailed on Aug. 21, 2019, 6 pages.

International Search Report and Written Opinion; Application No. PCT/US2020/030895, mailed on Jun. 9, 2020, 10 pages.

International Search Report and Written Opinion; Application No. PCT/US2020/030896, mailed on Jun. 9, 2020, 10 pages.

U.S. Appl. No. 16/864,172, filed May 1, 2020, Gregory Scot Miracle, et al.

All Office Actions; U.S. Appl. No. 16/864,172.

Why Copper, Copper Development Association, (Year: 1940), pp. 1-9.

Your household water quality, Housing and Environment, (Year: 1914), pp. 1-2.

* cited by examiner

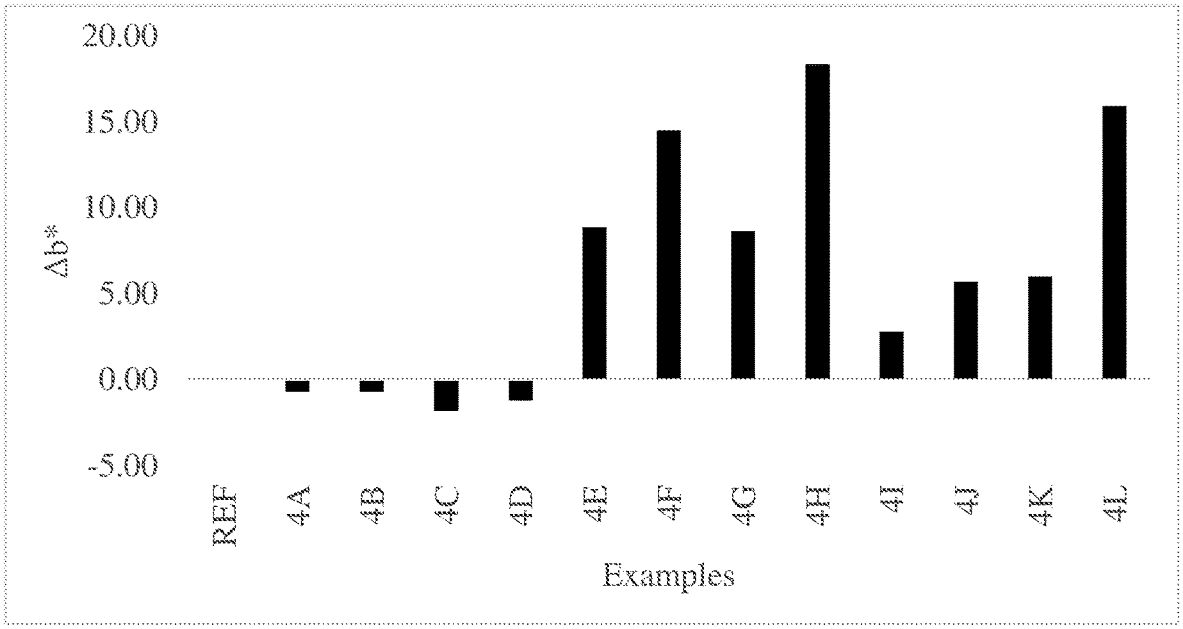
20.00
15.00
10.00
5.00
0.00
-5.00
Δb*
REF
4A
4B
4C
4D
4E
4F
4G
4H
4I
4J
4K
4L
Examples

PARTICLE TREATMENT COMPOSITIONS COMPRISING AN ANTIOXIDANT

FIELD OF THE INVENTION

The present disclosure relates to particulate treatment compositions comprising antioxidants. The present disclosure further relates to related methods of use and preparation of such treatment compositions.

BACKGROUND OF THE INVENTION

Consumers continually express interest in treatment products and processes that remove soils from surfaces, such as fabrics, and leave surfaces smelling pleasant. Soil left on surfaces leads to the production of malodorous materials. Malodor is often an indication to consumers that a surface is not clean. Thus, manufacturers of consumer cleaning products and industrial cleaning products are continuously seeking to provide treatment compositions and processes that provide improved malodor control or malodor reduction.

While many soils are removed from surfaces by surfactants during a treatment process, oftentimes some soils remain on the surface. Current trends in surface treatment compositions and processes, such as decreased wash temperatures, shorter wash times, lower concentrations of cleaning actives, such as surfactants, and the general trend to use surface treatment compositions having fewer harsh chemicals, decrease the efficacy of many surface treatment compositions and processes. As a consequence, the level of incompletely removed soils remaining on surfaces after being treated is increasing. Such soils can cause malodors on surfaces, which may persist or even form after the treatment process is finished. One solution in combating this problem is the incorporation of perfumes into treatment processes and products, or the use of perfume products used directly on the surfaces by consumers. However, perfumes act only to mask the malodor and do not address the underlying problem of the remaining soils. Perfumes often dissipate relatively quickly and are not a long-lasting solution. Further, consumers may be sensitive to perfumes and may not want perfumes in the treatment products they use. For manufacturers, perfumes can be expensive.

Certain antioxidants are known to be used in surface treatment compositions as malodor reducing agents. Such antioxidants may facilitate malodor reduction by retarding autoxidation events in remaining soils even after the treatment process, that lead to the formation of malodorous materials. Such antioxidants are generally incorporated at low levels within many treatment products. Antioxidants may be deposited from an aqueous solution onto the surface during the treatment process. However, the deposited antioxidants may be lost from the surface over time due to, for example, consumption of the antioxidant, transfer through physical contact with other objects or, as Applicant has found, by sublimation. After a certain period of time, the level of antioxidant deposited on a surface may deplete to a level where it is no longer effective as a malodor reduction agent. For fabric surfaces, there may be a considerable amount of time, such as several days or even weeks, between when a garment is washed and then worn, and so, a consumer may not enjoy the benefit that they presumed they would when they purchased and used the treatment product.

Further, for the antioxidant to even deposit on the surface, it must be properly dispersed by a dispersing agent. Surfactants, such as those found within fabric detergent compositions, are commonly used as antioxidant dispersing agents.

For ease of manufacturing, manufacturers will generally include antioxidants within detergent compositions already having multiple surfactants. However, the antioxidant may react with other ingredients within the detergent composition, lessening the antioxidant's efficacy as well as the efficacy of the other ingredients. For example, surfactants in detergent compositions, although helpful in dispersion of antioxidants, may interact with antioxidants and hinder the level of antioxidant deposited onto the surface.

In addition to the difficulties found in dispersing and depositing antioxidants onto surfaces, some antioxidants may undergo transformation processes while on the shelf, leading to discoloration or yellowing of the product it is incorporated within. Discoloration, particularly yellowing, of a product may signal to consumers that the product is expired or may discolor the surfaces intended to be treated.

As such, there is a need for improved treatment compositions and treatment processes that provide malodor benefits, without significant discoloration/yellowing problems.

SUMMARY OF THE INVENTION

A treatment composition comprising a plurality of first particles. Each first particle comprises from greater than 2% to about 50%, by weight of each first particle, of an antioxidant; and a water-soluble first carrier. Each first particle further comprises less than about 20%, by weight of each first particle, of polyvinyl alcohol.

A treatment composition comprising: a plurality of first particles and a plurality of second particles. Each first particle comprises an antioxidant and a water-soluble first carrier. Each second particle comprises a second particle surfactant and a water-soluble second carrier. The ratio of second particle surfactant to antioxidant in the treatment composition is at least 1:1.

A treatment composition comprising a plurality of first particles. Each first particle comprises from about 0.001% to about 50%, by weight of each first particle, of an antioxidant; a water-soluble first carrier; and from about 2% to about 25%, by weight of each first particle, of a first particle surfactant. A process for treating a surface including the steps of providing a surface, providing a treatment composition, and treating the surface with the treatment composition in the presence of water. Each first particle may comprise from about 2% to about 50%, by weight of each first particle, of an antioxidant, and a water-soluble first carrier. Each first particle may comprise less than about 20%, by weight of each first particle, of polyvinyl alcohol. The treatment composition and the water form a wash liquor. The wash liquor may comprise from about 25 ppb to about 5 ppm of the antioxidant.

BRIEF DESCRIPTION OF THE DRAWINGS

FIG. 1 is a graph showing the Δb* color change of examples 4A-4L.

DETAILED DESCRIPTION OF THE INVENTION

The present disclosure relates to treatment compositions that include a plurality of first particles comprising antioxidants and water-soluble first carriers. Applicant has found that such antioxidants can provide surprising malodor benefits, for example, to laundered fabrics.

Without wishing to be bound by theory, it is believed that metal ions, such as copper ions (e.g., $Cu^{2+}$), in a treatment liquor or left on a target surface can initiate the autoxidation process of soils, such as sebum, on a target surface. Such breakdown of the sebum soils into their oxidation products may release volatile, malodorous compounds. During the propagation stage of autoxidation of soils, the soils are broken down into smaller, lower molecular weight, volatile aldehyde species. Propagation reactions can be repeated many times before termination by conversion of an alkyl or peroxy radical to a nonradical species. Hydrogen-donating antioxidants, such as hindered phenols and secondary aromatic amines, inhibit oxidation by competing with the organic substrates for peroxy radicals. This shortens the kinetic chain length of the propagation reactions. As such, autoxidation is slowed down or halted.

However, to effectively deposit onto fabrics and retard the formation of malodorous species, the antioxidant must be effectively dispersed within an aqueous environment. An antioxidant dispersing agent that may be incorporated is a surfactant, particularly a nonionic surfactant. Surfactants may act to remove soils from surfaces and to disperse the antioxidant within an aqueous environment. However, surfactants may interact with the antioxidant, decreasing the amount that deposits on a surface. As aforementioned, antioxidants and surfactants are generally incorporated along with the other ingredients of a treatment composition in one singular matrix. A common matrix for treatment compositions is a liquid matrix. When ingredients are formulated within a liquid matrix, there is a greater propensity for interaction among the components due to the ability for movement of the molecules of the ingredients throughout the liquid matrix.

Applicant has found that manufacturers may avoid the aforementioned problems by formulating antioxidants of the present disclosure in a solid matrix (e.g., a particle). Applicant has found that when antioxidants of the present disclosure are formulated in a solid matrix, either with other ingredients or alone, the resulting treatment composition as well as the treated surface show deposition of the antioxidant onto the surface, without the surfactant hindering deposition.

Furthermore, Applicant has surprisingly found that certain water-soluble carrier materials may act as antioxidant dispersing agents. Applicant has found that even in the absence of surfactant, water-soluble carrier materials of the present disclosure are capable of effectively dispersing the antioxidants in aqueous environments such that the antioxidant may effectively deposits onto the target surface.

Applicant has further found that treatment compositions and processes of the present disclosure deliver high levels of antioxidant to the treated surface, allowing for the antioxidant to function for longer periods of time after treating the surface. By having antioxidant built-up on a surface, the antioxidant may act on new soils that are subsequently added to the surface, thereby reducing malodorous species from forming. Consumers may notice that their treated surfaces have reduced malodor for longer periods of time.

In addition, Applicant has found certain antioxidants may be formulated within the treatment compositions and processes of the present disclosure without discoloration or yellowing of the product. This is important as manufacturers may prefer materials that will not discolor or yellow over time so that the color they originally formulate remains fairly consistent. Discolored or yellowed product may have negative connotations to consumers, such as that the product has expired or that it may discolor the surface to be treated.

These findings allow for greater flexibility for consumers when treating surfaces, while still effectively delivering the benefit of malodor reduction. For example, consumers desire treatment compositions that are easy to dose and are not messy. By formulating the treatment compositions of the present disclosure into solid particles, manufacturers may provide an easy to dose product that avoids the dripping and spilling of liquid treatment compositions. In another example, consumers enjoy the convenience and control that comes through the use of additive treatment compositions. Such additive treatment compositions allow consumers to dose a desired amount of the additive separately from the detergent they employ, not to use the additive at all, or not to use the detergent at all. For example, a consumer may want to use a larger dose of a malodor reduction additive when washing garments prone to generate malodor, such as garments used for athletic activity. The treatment compositions and processes of the present disclosure address this problem by providing the malodor reduction agent, the antioxidant, with a water-soluble carrier material that is capable of dispersing the antioxidant, even in the absence of surfactant. However, should the consumer wish to also use surfactant, the treatment compositions and processes of the present disclosure may include surfactant without the lessening of efficacy of the antioxidant.

The treatment compositions and processes of the present disclosure are described in more detail below.

As used herein, the articles "a" and "an" when used in a claim, are understood to mean one or more of what is claimed or described. As used herein, the terms "include," "includes," and "including" are meant to be non-limiting. The treatment compositions of the present disclosure can comprise, consist essentially of, or consist of, the components/ingredients of the present disclosure.

The terms "substantially free of" or "substantially free from" may be used herein. This means that the indicated material is at the very minimum not deliberately added to the composition to form part of it, or, preferably, is not present at analytically detectable levels. It is meant to include compositions whereby the indicated material is present only as an impurity in one of the other materials deliberately included. The indicated material may be present, if at all, at a level of less than 0.1%, or less than 0.01%, or even 0%, by weight of the composition.

As used herein the phrases "fabric care composition", "laundry care composition", "fabric treatment composition" or "laundry treatment composition" includes compositions and formulations designed for treating fabric. Such compositions include but are not limited to, laundry cleaning compositions and detergents, fabric softening compositions, fabric enhancing compositions, fabric freshening compositions, laundry prewash, laundry pretreat, laundry additives, spray products, dry cleaning agent or composition, laundry rinse additive, wash additive, post-rinse fabric treatment, ironing aid, unit dose formulation, delayed delivery formulation, detergent contained on or in a porous substrate or nonwoven sheet, dryer sheet, and other suitable forms that may be apparent to one skilled in the art in view of the teachings herein. Such compositions may be used as a pre-laundering treatment, a post-laundering treatment, or may be added during the rinse or wash cycle of the laundering operation.

As used herein, "liquid" includes free-flowing liquids, as well as pastes, gels, foams and mousses. Non-limiting examples of liquids include light-duty and heavy-duty liquid detergent compositions, fabric enhancers, detergent gels commonly used for laundry, bleach and laundry additives. Gases, e.g., suspended bubbles, or solids, e.g., particles, may be included within the liquids. Liquid compositions may have from about 0% to about 90%, or from about 30% to about 90%, or from about 50% to about 80%, by weight of the composition, of water, and may include non-aqueous liquid detergents.

A "particle" as used herein refers to a volume of solid, or sufficiently solid, material that has finite mass. Particles may be free-flowing or suspended within a secondary composition. Free-flowing particles may be similar to those commercially available under the tradename UNSTOPABLES® from The Procter & Gamble Company, Cincinnati, Ohio, United States.

As used herein, the phrases "sufficiently solid" and "solid" mean that the material is capable of being picked up by tweezers without deformation of its shape at room temperature. A particle is considered to be solid if after cooling for 30 minutes at room temperature (~23° C.) the particle is capable of being picked up by tweezers without deformation of its shape. A "solid" as used herein includes, but is not limited to, particles, powders, agglomerates, and mixtures thereof. Non-limiting examples of solids include: particles, granules, micro-capsules, beads, flakes, noodles, and pearlized balls.

As used herein, the phrase "water-soluble", "water-soluble material," "water-soluble carrier material," and "water-soluble particle" means that the material, carrier material, or particle is soluble or dispersible in water, and preferably has a water-solubility of at least 50%, preferably at least 75% or even at least 95%, as measured by the method set out hereafter using a glass-filter with a maximum pore size of 20 microns: 50 grams±0.1 gram of the material, carrier material, and/or particles is added in a pre-weighed 400 mL beaker and 245 mL±1 mL of distilled water is added. This is stirred vigorously on a magnetic stirrer set at 600 rpm, for 30 minutes. Then, the mixture is filtered through a sintered-glass filter with a pore size as defined above (max. 20 micron). The steps are performed at ambient conditions. "Ambient conditions" as used herein means 23° C.±1.0° C. and a relative humidity of 50%±2%. The water is dried off from the collected filtrate by any conventional method, and the weight of the remaining material is determined (which is the dissolved or dispersed fraction). Then, the percentage solubility or dispersability can be calculated.

Unless otherwise noted, all component/ingredient or composition levels are in reference to the active portion of that component/ingredient or composition, and are exclusive of impurities, for example, residual solvents or by-products, which may be present in commercially available sources of such components/ingredients or compositions.

All temperatures herein are in degrees Celsius (° C.) unless otherwise indicated. Unless otherwise specified, all measurements herein are conducted at 20° C. and under the atmospheric pressure.

In all embodiments of the present disclosure, all percentages are by weight of the total composition, unless specifically stated otherwise. All ratios are weight ratios, unless specifically stated otherwise.

I. TREATMENT COMPOSITIONS

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

The present disclosure relates to treatment compositions that are suitable for treating a surface, preferably a fabric surface. The treatment composition may be a fabric care composition, such as a laundry care additive. Such treatment compositions may be used as a pre-laundering treatment, a post-laundering treatment, or may be added during the rinse or wash cycle of the laundering operation. Such treatment compositions may also be used in a dry-cleaning context.

The treatment composition may be selected from the group consisting of laundry additives, fabric enhancer compositions, dishwashing compositions, hard surface treating compositions, and mixtures thereof. Preferably, the treatment composition is a laundry additive or fabric enhancer composition. The treatment composition may be intended to be used during a wash cycle and/or a rinse cycle of an automatic washing machine.

The plurality of first particles and, when present, the plurality of second particles of the treatment composition may be free-flowing. It is also contemplated that the plurality of first particles, and, when present, the plurality of second particles may be contained within a single-compartment pouch, a multi-compartment pouch, a dissolvable sheet, a fibrous article, a dryer sheet, a tablet, a bar, or a mixture thereof. For example, the plurality of first particles may be contained within a first compartment of a multi-compartment pouch and the plurality of second particles may be contained within a second compartment of the multi-compartment pouch, wherein the multi-compartment pouch is formed of a water-soluble film. It is contemplated that the plurality of first particles and, when present, the plurality of second particles, may be suspended within a liquid.

Preferably, the plurality of first particles and, when present, the plurality of second particles of the treatment composition are free-flowing and are packaged within a container such that a consumer may open the container and simply dose the amount of particles desired. The container may be any container known in the art suitable for containing treatment compositions. For example, the container may have a volume of from about 50 $cm^3$ to about 1500 $cm^3$. The container may be of any suitable size and shape for placement on a grocery store shelf, for placement within a consumer's home, or for use within a commercial setting, such as a laundromat. The container may have a single chamber that contains the plurality of first particles and, when present, the plurality of second particles. The container may have multiple chambers wherein a first chamber may contain the plurality of first particles and a second chamber may contain the plurality of second particles. Each chamber may have its own separate lid. Such a multi-chamber container may be useful when a consumer wishes to dose one type of particle but not the other.

A plurality of first particles and/or a plurality of second particles may collectively comprise a dose. A single dose may comprise from about 1 g to about 40 g, alternatively from about 5 g to about 35 g, alternatively from about 13 g to about 27 g, alternatively from about 14 g to about 20 g, alternatively from about 15 g to about 19 g, alternatively from about 18 g to about 19 g, alternatively combinations thereof and any whole numbers of grams or ranges of whole numbers of grams within any of the aforementioned ranges, of the plurality of first particles and/or the plurality of second particles.

II. PARTICLES

The plurality of first particles and/or the plurality of second particles that form the treatment composition can be made up of individual particles having different masses, shapes, and/or sizes. The plurality of first particles and/or the plurality of second particles that form the treatment composition can be made up of individual particles having the same masses, shapes, and/or sizes.

Each first particle and each second particle may have a mass of from about 0.1 mg to about 5000 mg, or from about 1 mg to about 2500 mg, or from about 5 mg to about 1500 mg, or from about 5 mg to about 1000 mg, or from about 10 mg to about 200 mg, or from about 10 mg to about 100 mg, or from about 20 mg to about 50 mg, or from about 35 mg to about 45 mg, or combinations thereof and any whole numbers or ranges of whole numbers of mg within any of the aforementioned ranges. The plurality of first particles and/or the plurality of second particles may have a standard deviation of mass of less than about 30 mg, or less than about 15 mg, or less than about 5 mg, or about 3 mg. Individual particles having a mass in the aforesaid ranges can have dissolution times in water that permit the particles to dissolve during a typical wash cycle. Without being bound by theory, it is thought that the plurality of first particles and/or the plurality of second particles having such a standard deviation of mass can have a more uniform dissolution time in water as compared to particles having a broader standard deviation of mass. The mass of each first particle and each second particle can be set to provide the desired dissolution time. The plurality of first particles and/or the plurality of second particles may be substantially free of particles having a mass of less than about 0.1 mg. This can be practical for limiting the ability of the particles to become airborne. For clarity, the aforesaid disclosure on particle mass and standard deviation is meant to apply individually to the plurality of first particles, individually to the plurality of second particles, and to the mixture of a plurality of first particles and a plurality of second particles.

Each first particle and each second particle may have a shape selected from the group consisting of spherical, hemispherical, compressed hemispherical, lentil shaped, and oblong. The plurality of first particles and the plurality of second particles may include combinations of shapes. One skilled in the art may recognize that these shapes are non-limiting and each first particle and each second particle may have any other shape known in the art for such particles.

Each first particle and each second particle may have a maximum dimension (i.e., length, width, height, diameter) of from about 2 mm to about 10 mm, preferably from about 4 mm to about 8 mm Each first particle and each second particle may have a minimum dimension greater than about 1.5 mm, preferably greater than about 2 mm. The plurality of first particles and/or the plurality of second particles having the sizes disclosed herein can be substantial enough so that they do not readily become airborne when poured from a container, measuring cup, or other apparatus, into a vessel. Further, such sizes of the plurality of first particles and/or the plurality of second particles as disclosed herein can be easily and accurately poured from a container into a measuring cup, if desired.

Each first particle and each second particle may comprise less than about 20%, preferably less than about 15%, more preferably less than about 10%, more preferably less than about 5%, even more preferably less than about 1%, by weight of each particle, of water. Each first particle and each second particle may be substantially free of water. The purpose of the present disclosure is to have solid particles, and thus the inclusion of high amounts of water would provide a more liquid state as well as pre-dissolution of the particles.

III. ANTIOXIDANT

The plurality of first particles may comprise from greater than 2% to about 50%, or to about 40%, or to about 30%, or to about 20%, or to about 10%, or to about 5%, by weight of each first particle, of an antioxidant. In an alternative example, the plurality of particles may comprise from about 0.001% to about 50%, by weight of each first particle, of an antioxidant, when from about 2% to about 25%, by weight of each first particle, of a first particle surfactant is present.

Antioxidants are substances as described in Kirk-Othmer (Vol. 3, page 424) and in Ullmann's Encyclopedia (Vol. 3, page 91).

The antioxidant may be selected from the group consisting of alkylated phenols, aryl amines, and mixtures thereof.

Alkylated phenols may have the general formula:

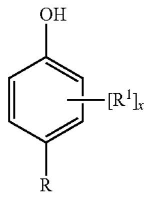

wherein $R^1$ is a $C_3$-$C_6$ branched alkyl, preferably tert-butyl; x is 1 or 2; and R is a $C_1$-$C_{22}$ linear alkyl or a $C_3$-$C_{22}$ branched alkyl, each (1) having optionally therein one or more ester (—$CO_2$—) or ether (—O—) links, and (2) optionally substituted by an organic group comprising an alkyleneoxy or polyalkyleneoxy group selected from EO, PO, BO, and mixtures thereof, more preferably from EO alone or from EO/PO mixtures; in an aspect R is preferably methyl or branched $C_3$-$C_6$ alkyl, $C_1$-$C_6$ alkoxy, preferably methoxy.

The alkylated phenol may be a hindered phenol. As used herein, the term "hindered phenol" is used to refer to a compound comprising a phenol group with either (a) at least one $C_3$ or higher branched alkyl, preferably a $C_3$-$C_6$ branched alkyl, preferably tert-butyl, attached at a position ortho to at least one phenolic —OH group, or (b) substituents independently selected from the group consisting of a $C_1$-$C_6$ alkoxy, preferably methoxy, a $C_1$-$C_{22}$ linear alkyl or $C_3$-$C_{22}$ branched alkyl, preferably methyl or branched $C_3$-$C_6$ alkyl, or mixtures thereof, at each position ortho to at least one phenolic —OH group. If a phenyl ring comprises more than one —OH group, the compound is a hindered phenol provided at least one such —OH group is substituted as described immediately above.

Suitable hindered phenols for use herein include, but are not limited to, 2,6-bis(1,1-dimethylethyl)-4-methyl-phenol (also known as hydroxy butylated toluene, "BHT"); 3,5-bis (1,1-dimethylethyl)-4-hydroxy-benzenepropanoic acid, methyl ester; 3,5-bis(1,1-dimethylethyl)-4-hydroxy-benzenepropanoic acid, octadecyl ester; δ-tocopherol; 2,6-bis(1-methylpropyl)phenol; 2-(1,1-dimethylethyl)-1,4-benzenediol; 2,4-bis(1,1-dimethylethyl)-phenol; 2,6-bis(1,1-dimethylethyl)-phenol; 2-(1,1-dimethylethyl)-4-methyl-phenol; 2-(1,1-dimethylethyl)-4,6-dimethyl-phenol; 3,5-bis (1,1-dimethylethyl)-4-hydroxybenzenepropanoic acid, 1,1'-

[2,2-bis[[3-[3,5-bis(1,1-dimethylethyl)-4-hydroxyphenyl]-1-oxopropoxy]methyl]-1,3-propanediyl] ester; 2,2'-methylenebis[6-(1,1-dimethylethyl)-4-methylphenol; 2-(1,1-dimethylethyl)-phenol; 2,4,6-tris(1,1-dimethylethyl)-phenol; 4,4'-methylenebis[2,6-bis(1,1-dimethylethyl)-phenol; 4,4',4"-[(2,4,6-trimethyl-1,3,5-benzenetriyl)tris(methylene)] tris[2,6-bis(1,1-dimethylethyl)-phenol]; N,N'-1,6-hexanediylbis[3,5-bis(1,1-dimethylethyl)-4-hydroxybenzenepropanamide; 3,5-bis(1,1-dimethylethyl)-4-hydroxybenzoic acid, hexadecyl ester; P-[[3,5-bis(1,1-dimethylethyl)-4-hydroxyphenyl]methylphosphonic acid, diethyl ester; 1,3,5-tris[[3,5-bis(1,1-dimethylethyl)-4-hydroxyphenyl]methyl]-1,3,5-triazine-2,4,6(1H,3H,5H)-trione; 3,5-bis(1,1-dimethylethyl)-4-hydroxybenzenepropanoic acid, 2-[3-[3,5-bis(1,1-dimethylethyl)-4-hydroxyphenyl]-1-oxopropyl]hydrazide; 3-(1,1-dimethylethyl)-4-hydroxy-5-methylbenzenepropanoic acid, 1,1'-[1,2-ethanediylbis(oxy-2,1-ethanediyl)] ester; 4-[(dimethylamino)methyl]-2,6-bis(1,1-dimethylethyl)phenol; 4-[[4,6-bis(octylthio)-1,3,5-triazin-2-yl]amino]-2,6-bis(1,1-dimethylethyl)phenol; 3,5-bis(1,1-dimethylethyl)-4-hydroxybenzenepropanoic acid, 1,1'-(thiodi-2,1-ethanediyl) ester; 3,5-bis(1,1-dimethylethyl)-4-hydroxybenzoic acid, 2,4-bis(1,1-dimethylethyl)phenyl ester; 3,5-bis(1,1-dimethylethyl)-4-hydroxybenzenepropanoic acid, 1,1'-(1,6-hexanediyl)ester; 3-(1,1-dimethylethyl)-4-hydroxy-5-methylbenzenepropanoic acid, 1,1'-[2,4,8,10-tetraoxaspiro[5.5]undecane-3,9-diylbis(2,2-dimethyl-2,1-ethanediyl)] ester; 3-(1,1-dimethylethyl)β-[3-(1,1-dimethylethyl)-4-hydroxyphenyl]-4-hydroxy-β-methylbenzenepropanoic acid, 1,1'-(1,2-ethanediyl) ester; 2-[[3,5-bis(1,1-dimethylethyl)-4-hydroxyphenyl]methyl]-2-butylpropanedioic acid, 1,3-bis(1,2,2,6,6-pentamethyl-4-piperidinyl) ester; 3,5-bis(1,1-dimethylethyl)-4-hydroxybenzenepropanoic acid, 1-[2-[3-[3,5-bis(1,1-dimethylethyl)-4-hydroxyphenyl]-1-oxopropoxy]ethyl]-2,2,6,6-tetramethyl-4-piperidinyl ester; 3,4-dihydro-2,5,7,8-tetramethyl-2-[(4R,8R)-4,8,12-trimethyltridecyl]-(2R)-2H-1-benzopyran-6-ol; 2,6-dimethylphenol; 2,3,5-trimethyl-1,4-benzenediol; 2,4,6-trimethylphenol; 2,3,6-trimethylphenol; 4,4'-(1-methylethylidene)-bis[2,6-dimethylphenol]; 1,3,5-tris[[4-(1,1-dimethylethyl)-3-hydroxy-2,6-dimethylphenyl]methyl]-1,3,5-triazine-2,4,6(1H,3H,5H)-trione; 4,4'-methylenebis[2,6-dimethylphenol]; 2,6-bis(1-methylpropyl)phenol; and mixtures thereof.

Preferably, the hindered phenol is selected from the group consisting of 2,6-bis(1,1-dimethylethyl)-4-methyl-phenol; $C_1$-$C_{18}$ linear or branched alkyl esters of 3,5-bis(1,1-dimethylethyl)-4-hydroxy-benzenepropanoic acid; and mixtures thereof. Preferred examples of $C_1$-$C_{18}$ linear or branched alkyl esters of 3,5-bis(1,1-dimethylethyl)-4-hydroxy-benzenepropanoic acid include 3,5-bis(1,1-dimethylethyl)-4-hydroxy-benzenepropanoic acid, methyl ester (commercially available under the tradename RALOX® 35 from Raschig USA, Arlington, Texas, United States), and 3,5-bis(1,1-dimethylethyl)-4-hydroxy-benzenepropanoic acid, octadecyl ester (commercially available under the tradename TINOGARD® TS from BASF, Ludwigshafen, Germany).

In a preferred non-limiting example, the hindered phenol may be 2,6-bis(1,1-dimethylethyl)-4-methyl-phenol. Applicants have surprisingly found that, although 2,6-bis(1,1-dimethylethyl)-4-methyl-phenol is generally known in the art to form yellow by-products, it does not show yellowing behavior when incorporated into the particles of the present disclosure.

Additional phenolic antioxidants may be employed. Examples of suitable phenolic antioxidants may be selected from the group consisting of α-, γ-, γ-tocopherol; 2,2,4-trimethyl-1,2-dihydroquinoline; tert-butyl hydroxyanisole; 6-hydroxy-2,5,7,8-tetramethylchroman-2-carboxylic acid; and mixtures thereof.

An example of an aryl amine useful as an antioxidant in particles of the present disclosure is ethoxyquin (e.g., 1,2-dihydro-6-ethoxy-2,2,4-trimethylquinoline, commercially available under the tradename RALUQUIN™, from Raschig USA, Arlington, Texas, United States). The aryl amine may be a diarylamine Diarylamines that are useful in this invention can be represented by the general formula

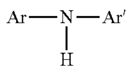

wherein Ar and Ar' are each independently selected from aromatic aryl radicals and heteroaromatic aryl radicals, wherein at least one aryl radical is substituted. Suitable diarylamines may include, but are not limited to, 4-(1,1,3,3-tetramethylbutyl)-N-[4-(1,1,3,3-tetramethylbutyl)phenyl]-benzenamine (commercially available under the tradename IRGANOX® 5057 from BASF, Ludwigshafen, Germany) and 4-(1-methyl-1-phenylethyl)-N-[4-(1-methyl-1-phenylethyl)phenyl]-benzenamine (commercially available under the tradename NAUGARD® 445 from Addivant, Danbury, Connecticut, United States).

IV. WATER-SOLUBLE CARRIER

The particles of the present disclosure include a water-soluble carrier. Each first particle may comprise a water-soluble first carrier. When present, each second particle may comprise a water-soluble second carrier. Generally, the water-soluble first carrier is present at a level of from about 20% to about 98%, by weight of each first particle. Generally, the water-soluble second carrier is present at a level of from about 20% to about 98%, by weight of each second particle. The level of carrier material in each first particle and each second particle may depend upon the type and/or levels of other ingredients incorporated within the particle.

The water-soluble first carrier and the water-soluble second carrier may be the same material. For first particles and second particles processed as a melt, it can be convenient to have the water-soluble first carrier and the water-soluble second carrier be the same material. This enables the manufacture of both the first particles and the second particles on the same or similar manufacturing equipment using the same or similar processing settings, such as temperature, line speed, liquid controls, and the like. Further, having the same or similar carrier material may allow for similar dissolution profiles in the wash. The water-soluble first carrier and the water-soluble second carrier may be different materials. By using different carrier materials, the dissolution properties of the plurality of first particles and the plurality of second particles can be controlled or set or selected independently. For instance, when the plurality of second particles are present, it may be beneficial to have the second particles comprising a second particle surfactant dissolve before the first particles comprising an antioxidant, so that the surfactant removes soils from the fabrics prior to antioxidants depositing on the fabrics.

Each first particle comprises less than about 20%, or less than about 15%, or less than about 10%, or less than about 5%, or less than about 1%, by weight of each first particle, of polyvinyl alcohol (PVOH). Each second particle may comprise less than about 20%, or less than about 15%, or less than about 10%, or less than about 5%, or less than about 1%, by weight of each second particle, of polyvinyl alcohol (PVOH). The incorporation of greater than about 20% of polyvinyl alcohol (PVOH) within each particle may result in particles that are not sufficiently solid. It is desirable for particles of the present disclosure to be sufficiently solid so that ingredients within the particles are limited in interacting with one another prior to use for their intended benefit (i.e., in the presence of water to treat a surface).

Each of the water-soluble first carrier and the water-soluble second carrier may be independently selected from the group consisting of polymers, inorganic salts, organic salts, carbohydrates, urea, and mixtures thereof.

A. Polymers

Each of the water-soluble first carrier and, when present, the water-soluble second carrier may comprise a polymer. Water-soluble polymers can be relatively easily processed with other formulation ingredients that make up the plurality of first particles and the plurality of second particles.

The polymer may be selected from the group consisting of polyvinyl alcohols (PVOH), modified PVOHs; polyvinyl pyrrolidone; PVOH copolymers (e.g, PVOH/polyvinyl pyrrolidone and PVOH/polyvinyl amine); polyvinyl acetates; partially hydrolyzed polyvinyl acetate; polypropylene glycols; polyalkylene oxides (pure or mixed, e.g., polyethylene oxide, polypropylene oxide, and mixtures thereof, such as triblock PEG-PPG-PEG polymers); polyethylene glycols (PEGs); acrylamide; acrylic acid; cellulose, alkyl cellulosics (e.g., methyl, ethyl and propyl cellulose); cellulose ethers; cellulose esters; cellulose amides; polycarboxylic acids and salts; polyaminoacids or peptides; polyamides; polyacrylamide; copolymers of maleic/acrylic acids; polysaccharides (e.g., starch and modified starch); gelatin; alginates; xyloglucans, other hemicellulosic polysaccharides (e.g., xylan, glucuronoxylan, arabinoxylan, mannan, glucomannan, and galactoglucomannan); natural gums (e.g., pectin, xanthan, and carrageenan locus bean, arabic, tragacanth); and combinations thereof.

Preferably, the polymer is polyethylene glycol (PEG) having a weight average molecular weight of from about 2000 Da to about 15,000 Da, preferably from about 4000 Da to about 13,000 Da, more preferably from about 6000 Da to about 11,000 Da, even more preferably from about 7000 Da to about 9000 Da. Applicant has surprisingly found that polyethylene glycol (PEG) of the disclosed weight average molecular weights is able to sufficiently disperse antioxidants for deposition on fabrics in the wash. Further, polyethylene glycol (PEG) can be a convenient material to employ to make particles because it can be sufficiently water-soluble to dissolve during a wash cycle when the particles have the range of mass disclosed herein; it is easily processed as a melt; and it is of low cost to manufacturers. An example of a suitable polyethylene glycol (PEG) is commercially available under the tradename PLURIOL® E 8000 from BASF, Ludwigshafen, Germany.

Examples of further polymers suitable for use as water-soluble first carriers and water-soluble second carriers may include, but are not limited to, polyalkylene polymers of formula $H—(C_2H_4O)_x—(CH(CH_3)CH_2O)_y—(C_2H_4O)_z—OH$ wherein x is from about 50 to about 300, y is from about 20 to about 100, and z is from about 10 to about 200; polyethylene glycol fatty acid esters of formula $(C_2H_4O)_q—C(O)O—(CH_2)_r—CH_3$ wherein q is from about 20 to about 200 and r is from about 10 to about 30; polyethylene glycol fatty alcohol ethers of formula $HO—(C_2H_4O)_s—(CH_2)_t)—CH_3$ wherein s is from about 30 to about 250 and t is from about 10 to about 30; C8-C22 alkyl polyalkoxylates comprising more than about 40 alkoxylate units; block copolymers based on ethylene oxide and/or propylene oxide; and mixtures thereof. Non-limiting examples of block copolymer based on ethylene oxide and propylene oxide may include those commercially available under the tradenames PLURONIC® F38, PLURONIC® F68, PLURONIC® F77, PLURONIC® F87, PLURONIC® F88, and other PLURONIC® materials from BASF, Ludwigshafen, Germany.

B. Inorganic Salts

Suitable inorganic salts for the water-soluble first carrier and/or the water-soluble second carrier may be selected from the group consisting of inorganic alkali metal salt (e.g., salts of lithium, salts of sodium, salts of potassium); inorganic alkaline earth metal salts; and mixtures thereof.

C. Organic Salts

Suitable organic salts for the water-soluble first carrier and/or the water-soluble second carrier may be selected from the group consisting of organic alkali metal salts; organic alkaline earth metal salt (e.g., sorbic acid); and mixtures thereof.

D. Carbohydrates

E. Balancing Agent

The carbohydrates may be any water-soluble carbohydrates known to one skilled in the art capable of producing particles of the present disclosure.

Depending on the application, the plurality of first particles and when present, the plurality of second particles, may comprise from about 0.5% to about 5% by weight of each particle, of a balancing agent selected from the group consisting of glycerin, polypropylene glycol, isopropyl myristate, dipropylene glycol, 1,2-propanediol, and polyethylene glycol (PEG) having a weight average molecular weight of less than about 2000 Da, and mixtures thereof. The balancing agent may be useful for ensuring that the first and second particles have the same processing characteristics despite having different. For instance, two different scent variants of a product may have different levels of perfume. With use of a balancing agent, the water-soluble carrier level can be the same in each scent variant and the formulas can be balanced with the balancing agent. This can make processing simpler in that the formulas for the scent variants will have the same level of water-soluble carrier and may have similar processing characteristics.

V. SURFACTANT

Treatment compositions according to the present disclosure may include a surfactant. The surfactant may be included in the plurality of first particles, the plurality of second particles, or in both the plurality of first particles and in the plurality of second particles.

The plurality of first particles may comprise from about 2% to about 25%, or any 1% increment therebetween, such as, for example, to about 20%, or to about 15%, or to about 10%, by weight of each first particle, of a first particle surfactant. The plurality of second particles may comprise from about 2% to about 25%, or any 1% increment therebetween, such as, for example, to about 20%, or to about 15%, or to about 10%, by weight of each second particle, of a second particle surfactant.

Each of the first particle surfactant and the second particle surfactant may comprise one or more surfactants. Each of the first particle surfactant and the second particle surfactant may be selected from the group consisting of a nonionic surfactant, an anionic surfactant, an amphoteric surfactant, a zwitterionic surfactant, a cationic surfactant, and mixtures thereof.

In an example, the treatment composition may comprise a plurality of first particles and a plurality of second particles according to the present disclosure. The ratio of the second particle surfactant to the antioxidant in the treatment composition may be at least 1:1, or at least 1.5:1, or at least 2:1. Such relative levels of second particle surfactant and antioxidant may provide the benefit of increased dispersion and deposition of the antioxidant onto the treated fabric. By keeping the antioxidant and the surfactant in separate particles, the interaction of the two ingredients may be avoided prior to use of the treatment composition.

A. Nonionic Surfactant

Each of the first particle surfactant and second particle surfactant may independently include a nonionic surfactant. The nonionic surfactant may be selected from the group consisting of alkoxylated fatty alcohols (such as ethoxylated fatty alcohols); alkoxylated alkyl phenols; alkyl phenol condensates; mid-chain branched alcohols; mid-chain branched alkyl alkoxylates; alkylpolysaccharides; polyhydroxy fatty acid amides; ether capped poly(oxyalkylated) alcohol surfactants; and mixtures thereof. The alkoxylate units may be ethyleneoxy units, propyleneoxy units, or mixtures thereof. The nonionic surfactant may be linear, branched (e.g., mid-chain branched), or a combination thereof. Examples of commercially available alcohol and alkyl phenol condensates with ethylene oxide/propylene oxide block polymers include those commercially available under the tradename PLURONIC® from BASF, Ludwigshafen, Germany.

The nonionic surfactant may be selected from the group consisting of: $C_8$-$C_{18}$ alkyl ethoxylates; $C_6$-$C_{12}$ alkyl phenol alkoxylates wherein preferably the alkoxylate units are ethyleneoxy units, propyleneoxy units, or a mixture thereof; $C_{12}$-$C_{18}$ alcohol and $C_6$-$C_{12}$ alkyl phenol condensates with ethylene oxide/propylene oxide block polymers; alkylpolyglycosides; methyl ester ethoxylates; polyhydroxy fatty acid amides; ether capped poly(oxyalkylated) alcohol surfactants; and mixtures thereof.

Preferably, the nonionic surfactant comprises a $C_8$-$C_{18}$ alkyl ethoxylate (e.g., a $C_{12-14}$, $C_{12}$-$C_{15}$, or $C_{14}$-$C_{15}$ alkyl ethoxylate) having an average of from about 3 to about 9 ethoxy groups, or from about 7 to about 9 ethoxy groups. Examples of preferred $C_8$-$C_{18}$ alkyl ethoxylates include $C_{12}$-$C_{15}$ EO7 and $C_{14}$-$C_{15}$ EO7 nonionic surfactants commercially available under the tradename NEODOL® nonionic from Shell, The Hague, The Netherlands, and $C_{12}$-$C_{14}$ EO7 and $C_{12}$-$C_{14}$ EO9 nonionic surfactants commercially available under the tradename SURFONIC® from Huntsman Corporation, The Woodlands, Texas, United States.

B. Anionic Surfactant

Each of the first particle surfactant and second particle surfactant may independently include an anionic surfactant. Suitable anionic surfactants may include any conventional anionic surfactant known to one skilled in the art. Suitable anionic surfactants may include a sulfate detersive surfactant, e.g., alkoxylated and/or non-alkoxylated alkyl sulfate materials, and/or sulfonic detersive surfactants, e.g., alkyl benzene sulfonates. The anionic surfactant may be linear, branched, or combinations thereof. Preferred anionic surfactants may include linear alkyl benzene sulfonate (LAS), alkyl ethoxylated sulfate (AES), alkyl sulfates (AS), or mixtures thereof. Other suitable anionic surfactants may include branched modified alkyl benzene sulfonates (MLAS), methyl ester sulfonates (MES), and/or alkyl ethoxylated carboxylates (AEC). The anionic surfactants may be present in acid form, salt form, or mixtures thereof. The anionic surfactant may be neutralized, in part or in whole, for example, by an alkali metal (e.g., sodium) or an amine (e.g., monoethanolamine) The anionic surfactant may be pre-neutralized, preferably with an alkali metal, an alkali earth metal, an amine such as an ethanolamine, or mixtures thereof.

C. Amphoteric Surfactant

Each of the first particle surfactant and second particle surfactant may independently include an amphoteric surfactant. Suitable amphoteric surfactants may include any conventional amphoteric surfactant known to one skilled in the art, such as amine oxides. Preferred amine oxides may include alkyl dimethyl amine oxide or alkyl amido propyl dimethyl amine oxide, more preferably alkyl dimethyl amine oxide and even more preferably coco dimethyl amino oxide. Amine oxide may have a linear or mid-branched alkyl moiety. Typical linear amine oxides may include water-soluble amine oxides containing one $R_1$ $C_{8-18}$ alkyl moiety and two $R_2$ and $R_3$ moieties selected from the group consisting of $C_{1-3}$ alkyl groups, $C_{1-3}$ hydroxyalkyl groups, and mixtures thereof. Preferably, the amine oxide is characterized by the formula $R_1$—$N(R_2)(R_3)O$ wherein $R_1$ is a $C_{8-18}$ alkyl and $R_2$ and $R_3$ are selected from the group consisting of methyl, ethyl, propyl, isopropyl, 2-hydroxyethyl, 2-hydroxypropyl and 3-hydroxypropyl. The amine oxide surfactant may include linear $C_{10}$-$C_{18}$ alkyl dimethyl amine oxides and linear $C_8$-$C_{12}$, alkoxy ethyl dihydroxy ethyl amine oxides.

D. Zwitterionic Surfactant

Each of the first particle surfactant and second particle surfactant may independently include a zwitterionic surfactant. Preferred zwitterionic surfactants include betaines, particularly alkyl betaine, alkylamidobetaine, amidazoliniumbetaine, sulfobetaine, hydroxybetaines, and phosphobetaines. Examples of suitable betaines may include alkyl dimethyl betaine and cocodimethyl amidopropyl betaine, N-alkyl-N,N-dimethylammino-1-propane sulfonate where the alkyl group can be $C_8$ to $C_{18}$, or from $C_{10}$ to $C_{14}$.

E. Cationic Surfactant

Each of the first particle surfactant and second particle surfactant may independently include a cationic surfactant. Suitable cationic surfactants may include alkyl pyridinium compounds, alkyl quaternary ammonium compounds, alkyl quaternary phosphonium compounds, alkyl ternary sulphonium compounds, and mixtures thereof.

Preferred cationic surfactants are quaternary ammonium compounds having the general formula: $(R)(R_1)(R_2)(R_3)N^+ X^-$ wherein, R is a linear or branched, substituted or unsubstituted $C_{6-18}$ alkyl or alkenyl moiety, $R_1$ and $R_2$ are independently selected from methyl or ethyl moieties, $R_3$ is a hydroxyl, hydroxymethyl or a hydroxyethyl moiety, X is an anion which provides charge neutrality, preferred anions include: halides, preferably chloride; sulphate; and sulphonate.

VI. ADJUNCT INGREDIENTS

Treatment compositions according to the present disclosure may include additional adjunct ingredients. Adjunct ingredients may independently be included in the plurality of first particles, the plurality of second particles, or in both the plurality of first particles and in the plurality of second particles. Adjunct ingredients may include, for example, perfumes, dyes, and silicones. Other adjunct ingredients known to those skilled in the art may be included as well.

Each of the plurality of first particles and/or when present, the plurality of second particles, may comprise less than about 0.1%, or from about 0.001% to about 0.1%, or from about 0.01% to about 0.02%, or and any hundredths of percent or ranges within any of the aforementioned ranges, by weight of each respective particle, of a dye. Examples of suitable dyes include, but are not limited to, those commercially available under the tradenames LIQUITINT® Pink, LIQUITINT® Aqua, and LIQUITINT® Violent from Milliken Chemical, Spartanburg, South Carolina, United States. Employing a dye can be practical to help the user differentiate between the plurality of first particles and, when present, the plurality of second particles, by using different colored dyes for the respective particles, if desired. Additionally, employing a dye may be beneficial in offsetting any discoloration or yellowing transformation products of the antioxidant employed.

Each of the plurality of first particles and/or when present, the plurality of second particles, may comprise from about 0.1% to about 20%, or from about 1% to about 15%, or from about 2% to about 10%, by weight of each particle, of a perfume. The perfume may be an unencapsulated perfume, an encapsulated perfume, or a perfume provided by another perfume delivery technology. Perfumes are generally described in U.S. Pat. No. 7,186,680. Encapsulated perfume can be provided as plurality of perfume microcapsules, which comprise a perfume oil enclosed within a shell. The perfume microcapsules can be friable perfume microcapsules. Perfume microcapsules can be those described in U.S. Patent Pub. 2008/0305982. Encapsulated perfumes may be beneficial in treatment compositions of the present disclosure as they may enhance the sensorial experience of the consumer particularly when combined with reduction in malodor brought on by the antioxidants.

The particles can be free or substantially free of a perfume, for instance, when perfume-free particles are desired for consumers sensitive to perfumes or not wanting perfumes to treat surfaces.

Each of the plurality of first particles and/or when present, the plurality of second particles, may comprise a chelating agent and/or crystal growth inhibitor. Suitable molecules include copper-, iron- and/or manganese-chelating agents and mixtures thereof. Suitable molecules include aminocarboxylates, aminophosphonates, succinates, salts thereof, and mixtures thereof. Non-limiting examples of suitable chelants for use herein include ethylenediaminetetracetates, N-(hydroxyethyl)-ethylene-diamine-triacetates, nitrilotriacetates, ethylenediamine tetraproprionates, triethylene-tetraamine-hexacetates, diethylenetriamine, diethylenetriamine-pentaacetates, ethanoldiglycines, ethylenediaminetetrakis (methylenephosphonates), diethylenetriamine penta(methylene phosphonic acid) (DTPMP), ethylenediamine disuccinate (EDDS), hydroxyethanedimethylenephosphonic acid (HEDP), methylglycinediacetic acid (MGDA), diethylenetriaminepentaacetic acid (DTPA), and 1,2-diydroxybenzene-3,5-disulfonic acid (Tiron), salts thereof, and mixtures thereof. Other non-limiting examples of chelants of use in the present invention are found in U.S. Pat. Nos. 7,445,644, 7,585,376 and 2009/0176684 A1. Other suitable chelating agents for use herein are those commercially available under the tradename DEQUEST® series from Italmatch Chemicals, Genoa, Italy, and chelants commercially available from Monsanto, St. Louis, Missouri, United States, DuPont Chemical, Wilmington, Delaware, United States, and Nalco Inc., Naperville, Illinois, United States.

VII. PROCESS FOR TREATING A SURFACE

The present disclosure relates to processes of using the treatment compositions described herein. The treatment compositions may be a fabric care composition and may be used to treat a surface, such as a fabric or other textile.

A process for treating a surface may comprise the steps of: providing a surface, preferably a fabric, more preferably a fabric surface soiled with sebum; providing a treatment composition comprising a plurality of first particles, each first particle comprising from greater than 2% to about 50%, by weight of each first particle, of an antioxidant, and a water-soluble first carrier, wherein each first particle comprises less than about 20%, by weight of each first particle, of polyvinyl alcohol; and treating the surface with the treatment composition in the presence of water, wherein the treatment composition and the water form a wash liquor comprising from about 25 ppb to about 5 ppm of the antioxidant.

The treatment composition may be diluted in the water by a factor of greater than about 500 to form the wash liquor, by which is meant that one dosage (or volume) of the treatment composition may be mixed with about 500 volumes of water. The dilution factor is preferably less than 2500. Particularly preferred dilution factors may fall within the range of from about 500 to about 1500, more preferably from about 500 to about 1000. Without wishing to be bound by theory, a dilution factor within the above ranges may allow for sufficient dissolution of the water-soluble first carrier and effective dispersion of the antioxidant.

The resulting wash liquor may comprise from about 25 ppb to about 5 ppm, preferably from about 20 ppb to about 10 ppm, more preferably from about 10 ppb to about 50 ppm, of the antioxidant. Without wishing to be bound by theory, it has been found that the above ranges of antioxidant, when used with the water-soluble first carrier of the present disclosure, may effectively deposit onto the surface in high enough levels that may provide a long-lasting benefit of malodor reduction on the surface.

The process may further comprise the step of providing a surfactant, preferably a nonionic surfactant. The plurality of first particles may comprise a first particle surfactant. The treatment composition may further comprise a plurality of second particles, each second particle comprising a second particle surfactant and a water-soluble second carrier. Or, the surfactant may be provided by a secondary fabric composition used in conjunction with the treatment composition. When a surfactant is provided, the resulting wash liquor may comprise from about 0.1 g/L to about 3 g/L of the surfactant. Such levels of surfactant may provide soil removal and assist in dispersing the antioxidant, while not negatively impacting the deposition of the antioxidant onto the surface.

The secondary fabric composition may include, but is not limited to, fabric detergent compositions, fabric additives, fabric softeners, rinse aids, and the like. The secondary fabric composition may comprise a secondary fabric composition surfactant. In a non-limiting example, the secondary fabric composition may be a fabric detergent composition comprising a secondary fabric composition surfactant, for example, from about 15% to about 90%, by weight of the fabric detergent composition, of the secondary fabric composition surfactant. Any suitable fabric detergent composition may be used, for example, a liquid fabric detergent composition, a soluble-unit dose fabric detergent composition, or a particulate fabric detergent composition. Non-limiting examples of suitable fabric detergent compositions may include those commercially available under the tradenames TIDE® ORIGINAL liquid and TIDE® ORIGINAL powder from The Procter & Gamble Company, Cincinnati, Ohio, United States.

The process may further comprise the steps of placing the surface into a washing machine and dispensing the treatment composition into the washing machine. The washing machine may be any vessel that a surface can be washed in, for instance, a sink, a bathtub, or an automatic laundry washing machine. When the washing machine is an automatic washing machine, the step of treating the surface with the treatment composition may occur during the wash cycle or during the rinse cycle of the automatic washing machine, preferably during the wash cycle. Any suitable washing machine may be used, for example, a top-loading or front-loading automatic washing machine. Those skilled in the art will recognize suitable machines for the relevant treatment operation.

Optionally, the treatment composition may be pre-measured in, for example, a measuring cup, prior to the step of treating the surface with the treatment composition. The measuring cup may be separate from the container in which the treatment composition is provided or may be a part of the container in which the treatment composition is provided, if provided in a container, e.g., a cap.

VIII. PRODUCTION OF PARTICLES

The following production methods of particles may be contemplated for the plurality of first particles as well as for the plurality of second particles.

For a water-soluble carrier that can be processed conveniently as a melt, a rotoforming process can be used. Particles can also be made using other approaches. For instance, granulation, press agglomeration, or roller compacting can be appropriate. Press agglomeration techniques include extrusion, roller compacting, pelleting, and tableting.

Optionally, the particles can be provided with inclusions of gas. Such inclusions of gas, for example, air can help the particles dissolve more quickly in the wash. Inclusions of gas can be provided by various ways like injecting gas into the molten precursor material and milling the mixture.

IX. TEST METHODS

A. Preparation of Molten Particle Material Method

A water-soluble carrier is melted overnight at 80° C. and a nonionic surfactant is also melted overnight at 50° C. Formulations are prepared in 2 oz. glass jars with ingredients added in the following order: antioxidant, nonionic surfactant (where specified), and water-soluble carrier. Each glass jar is then capped and placed in an oven set to 80° C. for two hours in order to re-melt any of the water-soluble carrier that may have solidified during the incorporation of ingredients. After two hours, the glass jars are removed from the oven, shaken by hand for approximately 30 seconds, and then placed back in the oven at 80° C. overnight (~16 hours) to allow for dissolution of the antioxidant. The glass jars are then removed from the oven. Each sample is in a molten, homogeneous state.

B. Preparation of Particles from Molten Particle Material Method

Molten particle material is prepared according to the Preparation of Molten Particle Material Method. An aliquot is taken from the sample in its molten, homogenous state using a 5 mL disposable syringe and subsequently dispensed as individual droplets on a sheet of aluminum foil. The sample is allowed to cool for 30 minutes at room temperature (~23° C.) to solidify into particles.

C. Preparation of Fabric Swatches Method

Stripped 4"×4" fabric swatches of nylon/spandex fabric (80% polyamide/20% spandex, Style NS, Code #19505, obtained from WFK America, LLC, PO Box 4530, Rock Hill, South Carolina, United States) are prepared for testing by washing the fabric four times (two cycles with 1.55 g/L of standard fabric care detergent without brightener; followed by two cycles with only water and no detergent, all in a standard washing machine set to Heavy Duty Cycle at approximately 49° C.). The fabrics are then dried using a standard dryer set to Permanent Press.

D. Deposition of Antioxidant onto Fabric Test Method

A sample solution is prepared in a 500 mL Erlenmeyer flask by adding 0.27 g of particles prepared according to the Preparation of Molten Particle Material Method and the Preparation of Particles from Molten Particle Material Method, a 10 mm glass marble, and 275 g of deionized water. Six stripped fabric swatches prepared according to the Preparation of Fabric Swatches Method are added to the flask. The solution with the six stripped fabric swatches is sufficient to provide a 25.0:1.0 wash liquor:fabric (w/w) ratio. The flask is placed on a standard laboratory shaker and agitated at the maximum setting for 10 minutes, after which the solution is removed by aspiration. The set of fabric swatches is spun dry for 1 minute using a standard spin dryer, then placed in a standard food dehydrator set to 50° C. for 30 minutes. Using a metal cutting die and a hydraulic press, test circles measuring 25 mm in diameter are then cut from the fabric swatches and placed in Mylar bags.

A calibration curve is determined for the antioxidant used at known concentrations using an HPLC machine set to an ultraviolet (UV) wavelength according to the chosen antioxidant. The fabric swatches treated with antioxidant are vortexed with an extraction buffer (90/10 acetonitrile/water; approximately a 1:8 w/w ratio between fabric swatches and extraction buffer) at room temperature (~23° C.) for two hours to extract the deposited antioxidant from each of the fabric swatches treated with antioxidant, forming an extracted antioxidant solution. An aliquot of the extracted antioxidant solution is added to an HPLC vial. A blank solvent (70/30 acetonitrile/water) is added to the extracted antioxidant solutions to form diluted samples to fit the calibration curve. The diluted extracted antioxidant solution is then measured and quantified against the antioxidant calibration curve previously described. The measurement output is given in μg of antioxidant/g diluted sample in the HPLC vial. To convert to μg of antioxidant/g of fabric, the following calculation is made:

$$\frac{\mu\text{g antioxidant}}{\text{g fabric}} = \frac{\mu\text{g antioxidant}}{\text{g diluted sample}} * \frac{\text{g diluted sample}}{\text{g aliquot of extracted antioxidant solution}} * \frac{\text{g extraction buffer}}{(\text{g fabric})}$$

E. Retention of Antioxidant on Fabric Over Time Test Method

Stripped nylon/spandex fabric swatches are prepared according to the Preparation of Fabric Swatches Method. Three stripped nylon/spandex fabric swatches remain free of solution. For the other three fabric swatches, 200 μL of a 0.025% antioxidant in methanol solution is pipetted onto each of the fabric swatches. The three treated fabric swatches are placed in a standard food dehydrator set to 40° C. for 10 minutes to dry. The other three stripped nylon/spandex fabric swatches remain free of solution. The six nylon/spandex fabric swatches are then alternatingly stacked one on top of the other starting with a treated nylon/spandex swatch as the base. The stack of fabric swatches is left in a covered petri dish at room temperature (~23° C.). The three treated fabric swatches are removed from the petri dish after a chosen time point. This procedure is replicated for each additional chosen time point.

For each time point, a new calibration curve is determined with the chosen antioxidant at known concentrations using an HPLC machine set to an ultraviolet (UV) wavelength according to the chosen antioxidant. The treated fabric swatches are vortexed with an extraction buffer (90/10 acetonitrile/water; approximately a 1:8 w/w ratio between fabric swatches and extraction buffer) at room temperature (~23° C.) for two hours to extract the deposited antioxidant from each of the fabric swatches forming an extracted antioxidant solution. An aliquot of the extracted antioxidant solution is added to an HPLC vial. Blank solvent (70/30 acetonitrile/water) is added to the extracted antioxidant solution to dilute the solution to fit the calibration curve. The diluted extracted antioxidant solution is then measured and quantified against the calibration curve previously described. The measurement output is given in μg of antioxidant/g diluted sample in the HPLC vial. After all three measurements are taken, the results are averaged.

F. L*a*b* Color Space Measurements

Samples of solid discs are prepared as follows: the molten state formulations prepared according to the Preparation of Molten Particle Material method are maintained in an oven at 80° C. for 16 days. An aliquot of the molten sample is dosed into a petri dish using a disposable syringe and left overnight on a laboratory bench to solidify into a solid disc of the dimensions of the petri dish. The solid disc sample is then analyzed for L*a*b* color space measurements using a spectrophotometer. The Δb* for each sample is calculated against a control sample of 100% of the chosen water-soluble carrier.

X. EXAMPLES

Example 1: Ability of Particles to be Formulated

To evaluate the ability of various antioxidants and nonionic surfactant (where specified) to be formulated in a water-soluble carrier, twelve different samples of fabric enhancing particles are prepared according to the Preparation of Molten Particle Material Method and the Preparation of Particles from Molten Particle Material Method. The formulations are set forth in Table 1, below.

TABLE 1

Particle formulations

| | Examples 1A-1D | | | |
|---|---|---|---|---|
| Ingredient | 1A (wt %) | 1B (wt %) | 1C (wt %) | 1D (wt %) |
| Water-soluble carrier[1] | Balance | Balance | Balance | Balance |
| Antioxidant[2] | 1 | 5 | 1 | 5 |
| Nonionic Surfactant[3] | — | — | 10 | 10 |

| | Examples 1E-1H | | | |
|---|---|---|---|---|
| Ingredient | 1E (wt %) | 1F (wt %) | 1G (wt %) | 1H (wt %) |
| Water-soluble carrier[1] | Balance | Balance | Balance | Balance |
| Antioxidant[4] | 1 | 5 | 1 | 5 |
| Nonionic Surfactant[3] | — | — | 10 | 10 |

TABLE 1-continued

Particle formulations

| | Examples 1I-1L | | | |
|---|---|---|---|---|
| Ingredient | 1I (wt %) | 1J (wt %) | 1K (wt %) | 1L (wt %) |
| Water-soluble carrier[1] | Balance | Balance | Balance | Balance |
| Antioxidant[5] | 1 | 5 | 1 | 5 |
| Nonionic Surfactant[3] | — | — | 10 | 10 |

[1]Polyethylene glycol PEG MW 8000 commercially available under the tradename PLURIOL ® E 8000 powder from BASF, Ludwigshafen, Germany. Added as a balance such that the ingredients totaled to 100% of the composition.

[2]2,6-bis(1,1-dimethylethyl)-4-methyl-phenol (butylated hydroxytoluene, "BHT").

[3]Nonionic surfactant commercially available under the tradename SURFONIC ® L24-9 from Huntsman Corporation, The Woodlands, Texas, United States.

[4]3,5-bis(1,1-dimethylethyl)-4-hydroxy-benzenepropanoic acid, methyl ester commercially available under the tradename RALOX ® 35 from Raschig USA, Arlington, Texas, United States.

[5]3,5-bis(1,1-dimethylethyl)-4-hydroxy-benzenepropanoic acid, octadecyl ester commercially available under the tradename TINOGARD ® TS from BASF, Ludwigshafen, Germany.

Each of Examples 1A-1L sufficiently solidified after being allowed to cool for 30 minutes at room temperature (~23° C.), demonstrating that the formulations of Table 1 are capable of forming solid particles. The particles of Table 1 are similar in this respect to particles currently commercially available under the tradename UNSTOPABLES® from The Procter & Gamble Company, Cincinnati, Ohio, United States.

Example 2: Deposition of Antioxidant onto Fabric

To evaluate the dispersion and deposition of antioxidant onto fabric and the effect of surfactant and water-soluble carrier on the dispersion and deposition of antioxidant onto fabric, solid particles from Example 1 are added to samples of fabric in deionized water. The samples of fabric are then dried and deposition of the antioxidant on the samples of fabric is measured.

Four sample solutions (Examples 2A, 2B, 2C, and 2D) are prepared according to the Deposition of Antioxidant onto Fabric Test Method under the following conditions: 1.55 g/L AATCC Standard Reference High Efficiency Detergent without brightener, Item #48805A, obtained from AATCC Research Triangle Park, North Carolina, United States; washing machine: Kenmore 600 Series washing machine; dryer: Maytag Commercial Dryer; antioxidant selected is BHT; laboratory shaker: Burrell Scientific Wrist Action™ Model 75 commercially available from Burrell Scientific, Pittsburgh, Pennsylvania, United States; spin dryer: Mini Countertop Spin Dryer commercially available from The Laundry Alternative, Inc., Nashua, New Hampshire, United States; food dehydrator: Nesco American Harvest food dehydrator model FD-80 commercially available from Nesco, Inc., Two Rivers, Wisconsin, United States; HPLC machine: Agilent 1260 Infinity Quaternary HPLC machine commercially available from Agilent, Santa Clara, California, United States; ultraviolet (UV) wavelength setting: 278 nm; aliquot of extracted antioxidant solution added to HPLC vial: 20 μL for Examples 2A and 2C; 10 μL for Examples 2B and 2D; blank solvent added to extracted antioxidant solution to form diluted sample: 1 mL blank solvent for Examples 2A and 2C; 1.5 mL blank solvent for Examples 2B and 2D.

Each experiment is run in triplicate to obtain an average and standard deviation. The results are in Table 2, below.

TABLE 2

| Deposition of Antioxidant onto Nylon/Spandex Fabric | | | | |
|---|---|---|---|---|
| Example | Particle from Example 1 in Solution | Antioxidant in Particle wt % | Surfactant in Particle wt % | Antioxidant on fabric ± Standard Deviation (μg antioxidant/g fabric) |
| 2A | 1A | 1% | 0% | 189 ± 6 |
| 2B | 1B | 5% | 0% | 951 ± 14 |
| 2C | 1C | 1% | 10% | 196 ± 13 |
| 2D | 1D | 5% | 10% | 1049 ± 19 |

The data in Table 2 demonstrates that the antioxidant can be formulated into a water-soluable carrier and formed into solid particles that dissolve when added to water, dispersing the antioxidant sufficiently to deposit it on the fabric. Surprisingly, the water-soluble carrier appears to sufficiently disperse the antioxidant even when surfactant is not present, such that the antioxidant deposits on fabric. However, the presence of surfactant appears to assist in dispersing the antioxidant. Moreover, contrary to what might be expected, addition of surfactant to the particles does not result in a decrease in the amount that deposits on fabric. This is surprising since surfactants are well known to solubilize materials of low water solubility by dissolving them in spontaneously formed dynamic structures like micelles. Inclusion of surfactants in aqueous solutions often leads to the removal of materials of low water solubility from fabric. In these examples, however, the presence of surfactant did not hinder deposition. In fact, it appears to have marginally improved deposition on fabric (compare 2C to 2A, 2D to 2B).

Even at higher levels, the particles comprising 5 wt % antioxidant deliver about five times as much antioxidant to the fabric than the particles containing 1 wt % antioxidant (compare 2B to 2A; 2D to 2C). Thus the data demonstrates that the particles may deliver onto the fabric a level of antioxidant representative of the level of antioxidant in the particle, without loss of the antioxidant.

Example 3: Retention of Antioxidant on Fabric Over Time

To evaluate the retention of the deposited antioxidant on the fabric over time, antioxidant in solution is deposited onto nylon/spandex fabric swatches and the level of antioxidant remaining on the fabric swatches is then measured at specified time intervals. Deposition data for three time points is determined according to the Retention of Antioxidant on Fabric Over Time Test Method under the following conditions: antioxidant selected is BHT; food dehydrator: Nesco American Harvest food dehydrator model FD-80 commercially available from Nesco, Inc., Two Rivers, Wisconsin, United States; HPLC machine: Agilent 1260 Infinity Quaternary HPLC machine commercially available from Agilent, Santa Clara, California, United States; ultraviolet (UV) wavelength setting: 278 nm; time points selected are T=2.5 hours, T=3 days, and T=7 days; aliquot of extracted antioxidant solution added to HPLC vial: 30 μL; blank solvent added to extracted antioxidant solution to form diluted sample: 1.2 mL blank solvent.

After average measurements for all three time points is taken, the average measurement for each time point is then indexed relative to the value at a time point of 0. The index is calculated as follows:

$$\text{Antioxidant Retention Index} = \frac{\text{measured } BHT \text{ deposition on fabric at each time point } (\mu g)}{\text{total amount of } BHT \text{ at time 0 } (\mu g)}$$

The results are in Table 3, below.

TABLE 3

| Retention of Antioxidant on Nylon/Spandex Fabric | |
|---|---|
| Time (T) | Antioxidant Retention Index |
| T = 0 | 1 |
| T = 2.5 hours | 0.87 |
| T = 3 days | 0.53 |
| T = 7 days | 0.48 |

The data in Table 3 demonstrates that the antioxidant level on fabric decreases over time upon standing. Without wishing to be bound by theory, the antioxidant will eventually reach a level that is of no benefit if left standing long enough. In order to extend the time after treating the fabric and before wearing the fabric wherein the level of antioxidant remains effective, higher levels of antioxidant are required. For example, consider an antioxidant level of 1% and 5%. At the end of one week the expected levels present would be an index of about 0.5 and about 2.5. Therefore, the fabric with the higher loading of antioxidant will retain an effective level of antioxidant for a longer time, permitting the consumer to allow longer times between treating the fabric and wearing.

Example 4: Evaluation of Stability of Antioxidants in Particle

Samples 4A-4H are prepared and analyzed according to the Preparation of Molten Particle Material Method and the Retention of Antioxidant on Fabric Over Time Test Method under the following conditions: a 15 mL aliquot of each molten sample is dosed into an individual VWR® petri dish (catalog number 25384-090, 60 mm diameter, 15 mm height commercially available from VWR, Radnor, Pennsylvania, United States) using a 20 mL disposable syringe. The solid disc samples are analyzed using a HunterLab LabScan XE Reflectance Spectrophotometer (set to D65 illumination, 10° observer, UV light included, commercially available from HunterLab, Reston, Virginia, United States). The Δb* for each sample was calculated against a control sample of 100% polyethylene glycol PEG 8000 powder (commercially available under the tradename PLURIOL® E 8000 from BASF, Ludwigshafen, Germany).

The results are shown in Table 4 and in FIG. 1.

TABLE 4

L*a*b Color Space Measurements and Calculations

| Ex. | Material from Example 1 | Antioxidant wt % | Nonionic Surfactant wt % | Antioxidant Material | L* | a* | b* | Δb* |
|---|---|---|---|---|---|---|---|---|
| REF | — | 0% | | — | 81.68 | −0.38 | 1.30 | — |
| 4A | 1A | 1% | — | BHT | 83.14 | 0.11 | 0.60 | −0.70 |
| 4B | 1B | 5% | — | BHT | 80.88 | 0.02 | 0.63 | −0.67 |
| 4C | 1C | 1% | 10% | BHT | 79.68 | 0.29 | −0.50 | −1.80 |
| 4D | 1D | 5% | 10% | BHT | 80.24 | 0.86 | 0.11 | −1.19 |
| 4E | 1E | 1% | — | RALOX ® 35 | 80.12 | −1.96 | 10.13 | 8.83 |
| 4F | 1F | 5% | — | RALOX ® 35 | 78.91 | −2.54 | 15.79 | 14.49 |
| 4G | 1G | 1% | 10% | RALOX ® 35 | 79.27 | −2.67 | 9.90 | 8.60 |
| 4H | 1H | 5% | 10% | RALOX ® 35 | 72.80 | −4.07 | 19.64 | 18.34 |
| 4I | 1I | 1% | — | TINOGARD ® TS | 82.10 | −0.73 | 4.10 | 2.80 |
| 4J | 1J | 5% | — | TINOGARD ® TS | 75.26 | −1.72 | 6.98 | 5.68 |
| 4K | 1K | 1% | 10% | TINOGARD ® TS | 80.44 | −2.00 | 7.27 | 5.97 |
| 4L | 1L | 5% | 10% | TINOGARD ® TS | 68.29 | −4.97 | 17.22 | 15.92 |

The larger the absolute value of Δb* the more discolored the sample becomes. This may be important regardless of the starting color but is particularly important in pale or pastel colors and especially in white or near-white colors, where shifts to more yellow colors (positive Δb*) can be negatively interpreted as degradation of the product. Therefore, where maintenance of color integrity is of highest concern, a preferred choice for a hindered phenolic antioxidant of choice would be BHT, since at both levels, regardless of the presence or absence or nonionic surfactant, the color shift is minimal. For RALOX® 35 and TINOGARD® TS, where differences were noted, the addition of nonionic surfactant generally increased the change in color over the antioxidant alone, making those samples more yellow. Despite the color change, these antioxidants can be acceptable for use where there is less of a concern for changes in color, for example in an opaque bottle, or for more deeply colored particles where changes in color are less consumer noticeable.

The Δb* measurements indicate that samples having BHT do not yellow over time whereas samples having RALOX® 35 and TINOGARD® TS do yellow over time. This is surprising and unexpected as BHT in many instances is known to form yellow byproducts when used as an antioxidant. Materials like RALOX® 35 and TINOGARD® TS were developed in part to address this yellowing concern of BHT and have been referred to as "non-yellowing antioxidants", yet in these experiments the observed behavior was opposite of expectation.

Combinations

A. A treatment composition comprising a plurality of first particles, each first particle comprising:
   i. from greater than 2% to about 50%, by weight of each first particle, of an antioxidant; and
   ii. a water-soluble first carrier;
   wherein each first particle comprises less than about 20%, by weight of each first particle, of polyvinyl alcohol.

B. The treatment composition according to Paragraph A, wherein the antioxidant is selected from the group consisting of alkylated phenols, aryl amines, and mixtures thereof.

C. The treatment composition according to any one of Paragraphs A or B, wherein the alkylated phenol is a hindered phenol selected from the group consisting of 2,6-bis(1,1-dimethylethyl)-4-methyl-phenol; $C_1$-$C_{18}$ linear or branched alkyl esters of 3,5-bis(1,1-dimethylethyl)-4-hydroxy-benzenepropanoic acid; and mixtures thereof, preferably the hindered phenol is 2,6-bis(1,1-dimethylethyl)-4-methyl-phenol.

D. The treatment composition according to any one of Paragraphs A to C, wherein the water-soluble first carrier is selected from the group consisting of polymers, inorganic salts, organic salts, carbohydrates, urea, and mixtures thereof.

E. The treatment composition according to Paragraph D, wherein the polymer is polyethylene glycol (PEG) having a weight average molecular weight of from about 2000 Da to about 15,000 Da.

F. The treatment composition according any one of Paragraphs A to E, wherein each first particle further comprises from about 2% to about 25%, by weight of each first particle, of a first particle surfactant, wherein the first particle surfactant is selected from the group consisting of a nonionic surfactant, an anionic surfactant, an amphoteric surfactant, a zwitterionic surfactant, a cationic surfactant, and mixtures thereof.

G. The treatment composition according to Paragraph F, wherein the nonionic surfactant is selected from the group consisting of alkoxylated fatty alcohols, alkoxylated alkyl phenols, alkyl phenol condensates, mid-chain branched alcohols, mid-chain branched alkyl alkoxylates, alkylpolysaccharides, polyhydroxy fatty acid amides, ether capped poly(oxyalkylated) alcohol surfactants, and mixtures thereof, preferably wherein the nonionic surfactant is a $C_8$-$C_{18}$ alkyl ethoxylate having an average of from about 3 to about 9 ethoxy groups.

H. The treatment composition according to any of Claims A to G, wherein the treatment composition further comprises a plurality of second particles, each second particle comprising a water-soluble second carrier and from about 2% to about 25%, by weight of each second particle, of a second particle surfactant.

I. The treatment composition according to Paragraph H, wherein the second particle surfactant is a nonionic surfactant, preferably the nonionic surfactant is selected from the group consisting of alkoxylated fatty alcohols, alkoxylated alkyl phenols, alkyl phenol condensates, mid-chain branched alcohols, mid-chain branched alkyl alkoxylates, alkylpolysaccharides, polyhydroxy fatty acid amides, ether capped poly(oxyalkylated) alcohol surfactants, and mixtures thereof, preferably wherein the nonionic surfactant is a $C_8$-$C_{18}$ alkyl ethoxylate having an average of from about 3 to about 9 ethoxy groups.

J. The treatment composition according to Paragraph H, wherein the ratio of second particle surfactant to antioxidant in the treatment composition is at least 1:1, preferably at least 1.5:1, more preferably at least 2:1.

K. The treatment composition according to any one of Paragraphs A to J, wherein the plurality of first particles further comprises a dye.

L. The treatment composition according to any one of Paragraphs A to K, wherein the plurality of first particles further comprises a perfume.

M. The treatment composition according to any one of Paragraphs A to L, wherein each first particle comprises less than about 20%, by weight of each first particle, of water.

N. The treatment composition according to any one of Paragraphs A to M, wherein each first particle has a mass of from about 0.1 mg to about 5000 mg.

O. A process for treating a surface, the process comprising the steps of:
  a. providing a surface;
  b. providing the treatment composition according to any one of Paragraphs A to N; and
  c. treating the surface with the treatment composition in the presence of water, wherein the treatment composition and the water form a wash liquor comprising from about 25 ppb to about 5 ppm of the antioxidant.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm"

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A treatment composition comprising a plurality of first particles, wherein:
  each first particle comprises a solid matrix and an antioxidant disposed in the solid matrix,
  the solid matrix comprises a water-soluble first carrier,
  the antioxidant is present in an amount of from about 5% to about 50% by weight of each first particle,
  the antioxidant comprises a hindered phenol selected from the group consisting of 2,6-bis(1,1-dimethylethyl)-4-methyl-phenol; $C_1$-$C_{18}$ linear or branched alkyl esters of 3,5-bis(1,1-dimethylethyl)-4-hydroxy-benzenepropanoic acid; and mixtures thereof,
  each first particle comprises less than about 20%, by weight of each first particle, of polyvinyl alcohol,
  the first particle is free of diacyl peroxide, and
  the treatment composition is configured to deposit at least about 189 micrograms of the antioxidant per gram of fabric.

2. The treatment composition according to claim 1, wherein the hindered phenol is 2,6-bis(1,1-dimethylethyl)-4-methyl-phenol.

3. The treatment composition according to claim 1, wherein the water-soluble first carrier is selected from the group consisting of polymers, inorganic salts, organic salts, carbohydrates, urea, and mixtures thereof.

4. The treatment composition according to claim 3, wherein the water-soluble first carrier is a polymer, and wherein the polymer is polyethylene glycol (PEG) having a weight average molecular weight of from about 2000 Da to about 15,000 Da.

5. The treatment composition according to claim 1, wherein each first particle further comprises from about 2% to about 25%, by weight of each first particle, of a first particle surfactant.

6. The treatment composition according to claim 5, wherein the first particle surfactant is selected from the group consisting of a nonionic surfactant, an anionic surfactant, an amphoteric surfactant, a zwitterionic surfactant, a cationic surfactant, and mixtures thereof.

7. The treatment composition according to claim 6, wherein the nonionic surfactant is selected from the group consisting of alkoxylated fatty alcohols, alkoxylated alkyl phenols, alkyl phenol condensates, mid-chain branched alcohols, mid-chain branched alkyl alkoxylates, alkylpolysaccharides, polyhydroxy fatty acid amides, ether capped poly (oxyalkylated) alcohol surfactants, and mixtures thereof.

8. The treatment composition according to claim 7, wherein the nonionic surfactant is a $C_8$-$C_{18}$ alkyl ethoxylate having an average of from about 3 to about 9 ethoxy groups.

9. The treatment composition according to claim 1, wherein the treatment composition further comprises a plurality of second particles, each second particle comprising a solid matrix and a second particle surfactant disposed in the solid matrix, wherein the solid matrix comprises a water-soluble second carrier, and wherein the second particle surfactant is present in an amount of from about 2% to about 25%, by weight of each second particle.

10. The treatment composition according to claim 9, wherein the second particle surfactant is a nonionic surfactant.

11. The treatment composition according to claim 10, wherein each first particle further comprises from about 2% to about 25%, by weight of each first particle, of a first particle surfactant selected from the group consisting of a nonionic surfactant, an anionic surfactant, an amphoteric surfactant, a zwitterionic surfactant, a cationic surfactant, and mixtures thereof.

12. The treatment composition according to claim 11, wherein the nonionic surfactant is selected from the group consisting of alkoxylated fatty alcohols, alkoxylated alkyl phenols, alkyl phenol condensates, mid-chain branched alcohols, mid-chain branched alkyl alkoxylates, alkylpolysaccharides, polyhydroxy fatty acid amides, ether capped poly (oxyalkylated) alcohol surfactants, and mixtures thereof.

13. The treatment composition according to claim 1, wherein the plurality of first particles further comprises a dye.

14. The treatment composition according to claim 1, wherein the plurality of first particles further comprises a perfume.

15. The treatment composition according to claim 1, wherein each first particle comprises greater than 0% and less than about 20%, by weight of each first particle, of water.

16. The treatment composition according to claim 1, wherein each first particle has a mass of from about 0.1 mg to about 5000 mg.

17. A treatment composition comprising:

a. a plurality of first particles, each first particle comprising a solid matrix and an antioxidant disposed in the solid matrix, wherein the solid matrix comprises a water-soluble first carrier, wherein the antioxidant is present in an amount of from about 10% to about 50%, by weight of the plurality of first particles; and b. a plurality of second particles, each second particle comprising a solid matrix and a second particle surfactant disposed in the solid matrix, wherein the solid matrix comprises a water-soluble second carrier;

wherein the ratio of second particle surfactant to antioxidant in the treatment composition is at least 1:1, wherein the first particle is free of diacyl peroxide, and wherein the treatment composition is configured to deposit greater than about 189 micrograms of the antioxidant per gram of fabric.

18. A treatment composition comprising a plurality of first particles, each first particle comprising a solid matrix, an antioxidant disposed in the solid matrix, and a first particle surfactant disposed in the solid matrix, wherein the solid matrix comprises a water-soluble first carrier, wherein the antioxidant is present in an amount of from about 5% to about 50% by weight of each first particle, wherein the first particle surfactant is present in an amount of from about 10% to about 25%, by weight of each first particle, wherein the first particle is free of diacyl peroxide, wherein the treatment composition is configured to deposit greater than about 189 micrograms of the antioxidant per gram of fabric.

* * * * *